United States Patent
Jones

[11] Patent Number: 6,151,799
[45] Date of Patent: Nov. 28, 2000

[54] CITRUS PEEL PROCESSING SYSTEM

[76] Inventor: Robert Allen Jones, 910 S. 8th St., Fernandina Beach, Fla. 32034

[21] Appl. No.: 09/361,456

[22] Filed: Jul. 27, 1999

[51] Int. Cl.$^7$ ....................................................... F26B 7/00
[52] U.S. Cl. ............................... 34/378; 34/384; 34/397; 34/68; 34/58; 34/236; 34/401
[58] Field of Search ........................ 34/68, 69, 77, 34/79, 131, 132, 169, 305, 378, 384, 397, 469, 499, 500, 417, 58, 401, 236

[56] References Cited

U.S. PATENT DOCUMENTS

| | | | |
|---|---|---|---|
| 4,225,628 | 9/1980 | Lynn | 426/629 |
| 4,313,372 | 2/1982 | Gerow et al. | 99/483 |
| 4,331,692 | 5/1982 | Drevici et al. | 426/310 |
| 4,547,226 | 10/1985 | Milch et al. | 127/41 |
| 5,915,815 | 6/1999 | Moore et al. | 34/305 |
| 5,997,930 | 12/1999 | Kendall et al. | 426/460 |
| 6,000,144 | 12/1999 | Bussmann et al. | 34/322 |

*Primary Examiner*—Pamela Wilson
*Assistant Examiner*—Michelle A Mattera
*Attorney, Agent, or Firm*—Thomas C. Saitta

[57] ABSTRACT

A system and method is described for processing waste citrus peel to remove oil from the peel in a highly efficient manner for subsequent processing, where the temperature of the peel is elevated, the peel is then finely fragmented to create a slurry, the solid particles are removed from the slurry and dried, and the oil is separated from the water in the slurry. The temperature of the peel is elevated by exposing the peel to steam so that minimal water is added.

27 Claims, 4 Drawing Sheets

CITRUS PEEL PROCESSING SYSTEM

BACKGROUND OF THE INVENTION

This invention relates generally to the field of methods and processing systems for treatment of large volumes of citrus peel or similar waste products to be converted into useable products and to extract desirable components for distinct applications. More particularly, the invention is such a method and system for the efficient removal of residual liquid and oil from the citrus peel, where a high percentage of available oil is recovered, a high percentage of the water is removed from the peel, the peel is fragmented into relatively small particles for subsequent processing, potential volatile organic contaminants (VOC's) are eliminated prior to the drying process, the resulting peel particles can be rendered food grade quality for human consumption, and where processing time, energy needs and costs are greatly minimized when compared to existing processes.

Nearly 50 billion pounds of citrus are processed each year, mainly to extract drinkable juices for the consumer market. The extraction of the juice creates a large amount of waste by-product in the form of orange peel, seeds, rag (the membranes between the citrus segments) and pulp. In the U.S., the waste organic material cannot be dumped into land fills, but instead must be converted into a useable product. The waste is primarily converted into citrus pulp pellets (CPP) for cattle feed, since the waste peel and other components provide filler and a protein source, although at only about 6% protein content it is not a high protein source food. Citrus oil contained within the peel is a marketable by-product, and current processing removes a relatively small amount (less than about 15% of the total available quantity) from the peel by extractors compressing the fruit sphere prior to removal of the juice and further processing. The oil is then further processed and refined and currently sells at about $0.35/pound in the form of cold press peel oil. The current technology for processing the waste peel operates at a loss—the costs are more to process the material than can be regained by selling the resulting products as a non-food grade material.

The current state of the art is a system which squeezes the peel to remove some of the citrus oil, slices the fruit in half, reams or presses the halves to remove the juice and pulp, and ejects the waste peel, rag, seed, etc. to a conveyor for transport to a peel processing plant. The peel is then delivered into fixed rotor blade hammer mills which rotate and thrash the peel in a very inefficient manner relative to particle size and rate control, with resulting particles ranging from one square inch pieces up to entire fruit halves. The thrashed peel is then placed into mixing augers where lime (calcium oxide) is added to dehydrate the peel; the lime contacts free water forming a basic anhydride reaction. Alternatively, the lime is sometimes applied prior to the hammer mill step. The result is an orange peel cake material containing about 80% residual water. The addition of the lime renders any subsequent products unsuitable for human consumption. The thrashed waste material is pressed, which removes approximately 10 to 15% of the free water along with some residual oil, which is called pressed liquor. The liquor is pumped to waste heat evaporators where water is evaporated to produce a low brix molasses of about 50 brix sugar content. This molasses is sprayed onto the cattle feed pellets produced from the peel particles to enhance the flavor and subsequent ingestion by beef and dairy cattle. The pressed peel particles are then passed through large, gas-fired, single-pass, low rpm (3–10), rotary dryers, typically about 18 feet in diameter by 80 feet in length, where predominantly gas fired air is heated to about 1500 degrees F. and raises the particle temperature to a range of about 290 to 700 degrees F. over the course of about 45 minutes. The high heat of the air in the dryer actually combusts or flashes off most of the volatile liquids and gases in the peel, emitting VOC's and associated hydrocarbons into the exhaust air to atmosphere. Burnt gases, liquids and solids coat and foul the interior ductwork and dryer contact surfaces, often leading to fires within the equipment and fan blade failures. Since the exhaust air contains a large amount of contaminants such as particulate matter, VOC's, oil, moisture, etc., the air flow must pass through scrubbers to remove a significant portion of the contaminants. The scrubbers typically utilize water sprays, which reduce the potentially recoverable heat energy of the exhaust air by about two thirds. This scrubbed air is then passed to heat recovery equipment, where the lowered heat value (about 180 degrees F.) is then used as the heat source in waste heat evaporators for the production of molasses. Currently, exhaust air must be scrubbed prior to passage through the heat recovery equipment to prevent plate surface fouling, which reduces performance and may cause failure. The dryer-discharged, dried peel matter has a moisture content of about 10 to 15% and is then pelletized into citrus peel pellets, ranging from about ⅜ to ¼ inches in diameter and from about ¼ to one and one quarter inches in length. The pellets are then sold as cattle feed at a price of about $40/ton, even though the processing costs to produce the pellets ranges from about $60–70/ton. The current systems utilize oil or natural gas combustion heating, are processes utilizing equipment which are not able to be cleaned on-line except by shutting down the process, are unable to recoup most of the exhaust heat energy, produce contaminated air which must be scrubbed prior to reuse or exhaust to the atmosphere, cannot remove any of the 85–90% residual citrus oil, and cannot produce a food grade product for human consumption due to the addition of lime during the process.

It is an object of this invention to provide a system and method which eliminates all or most of the drawbacks from the current waste peel processing and drying systems. It is an object of this invention to provide a waste peel collection, processing and drying system and methodology which incorporates on-line storage, continuous product temperature elevation and control, high-shear particle reduction and pumping to increase the exposed waste material surface area allowing more efficient removal of organic compounds prior to any drying steps which would release hazardous, volatile organic compounds into the exhaust gas and atmosphere, recovers a high percentage of reusable waste heat energy, and increases the recovery of usable by-products. These and other objects which are implied and inferred from the following disclosure are attained by providing a preferably continuous-flow processing system preferably incorporating live-bottom storage conveying equipment, flow metering with temperature elevation equipment, pulping equipment capable of creating small particle size from the waste peel, vibratory shaker table separating equipment to remove liquid from the solid waste particles, centrifuge equipment to remove water and solids from the oily liquid, press equipment to remove additional liquid, called liquor, from the waste particles, and dryer equipment to remove remaining moisture from the waste peel such that the waste may be pelletized or ground, with heat recovery means to extract the highest quantity of heat available from the dryer exhaust air to preheat air for the dryer, combustion air or air make-up, and to evaporate water from the pressed filtrate to produce citrus molasses.

SUMMARY OF THE INVENTION

In general, the invention is a method and system comprising interconnected equipment for the treatment or processing of citrus peel after removal of the juice and pulp to remove and capture citrus oil from the peel for subsequent processing and to convert the waste peel into a usable product in a highly efficient, environmentally friendly manner with low processing costs and high citrus oil recovery. The invention preferably comprises means to convey the waste citrus peel to a pulping means, preferably comprising a storage conveyor, an elevator conveyor, a metering tube and continuous weigh belt such that the delivery of the peel occurs in a controlled, uniform manner rather than by batch delivery, means to elevate the temperature of the waste peel, preferably comprising a live steam jacket incorporated into the metering tube, pulping means to fragment the waste peel into particles of small size thereby creating a slurry of water and citrus oil, preferably comprising a high-shear rotary disintegrator, means to separate liquid from the waste particles, preferably comprising a vibratory shaker table with hot water spraying system and a press, means to subsequently dry the solid particles, preferably comprising a defragmentor, a fluidized, stationary bed, low temperature, high air volume circulation dryer, heat recovery means for reuse of the dryer exhaust air, preferably comprising an exhaust air particulate screener and heat exchanger unit, the heat recovery means acting to preheat air for the dryer and/or to evaporate water from press liquor to create molasses, and centrifuge means to remove water and solids from the oil/liquid emulsion from the shaker table to create marketable citrus oil. It is preferred that suitable conduits for the liquids and conveyor means for the solids be provided connecting the various types of equipment in sequence such that the process can be performed in a continuous rather than in a batch manner, although less efficient batch processing where material is transferred in bulk batches between the various processing stages may also be utilized.

DETAILED DESCRIPTION OF THE INVENTION

Figure 1:
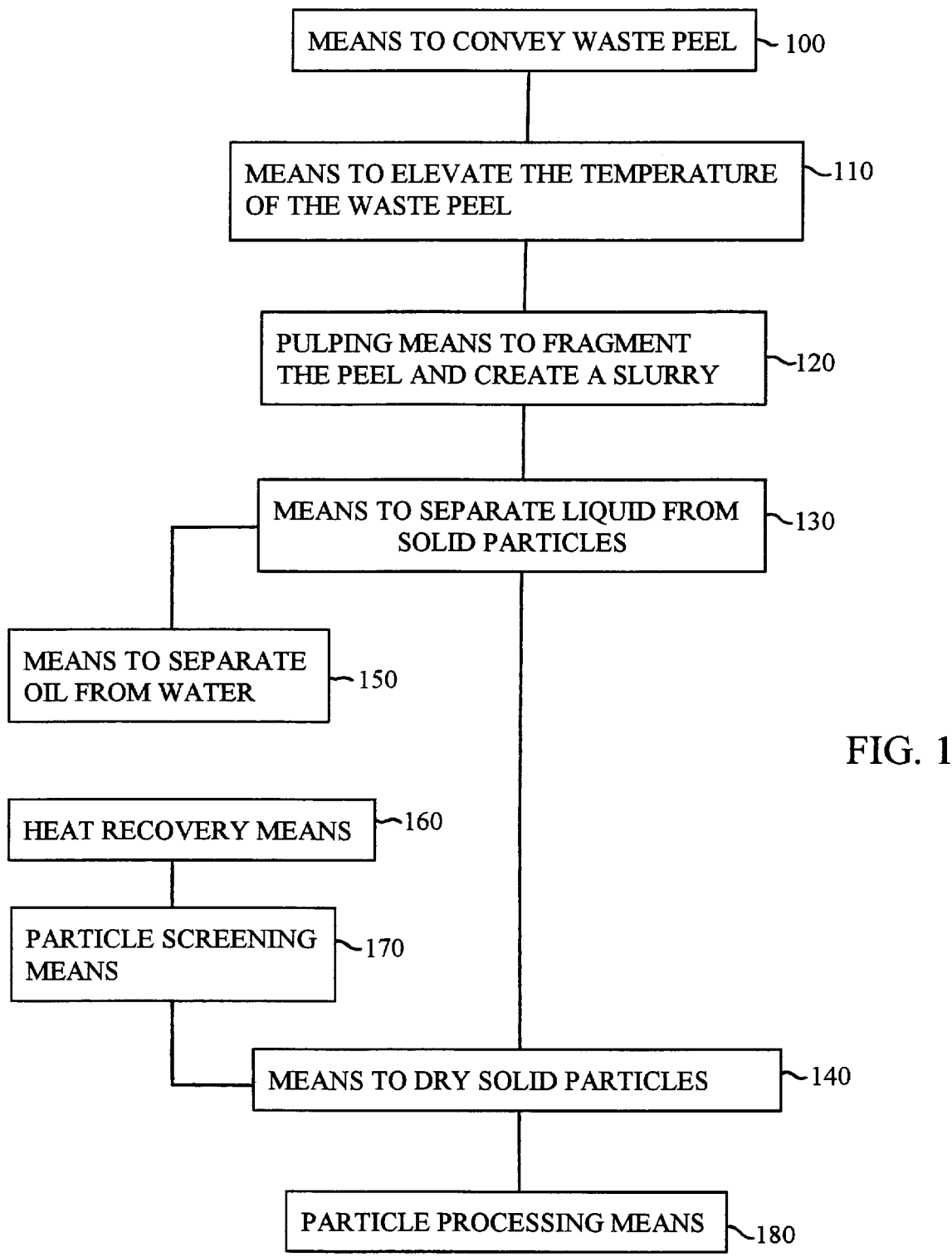
FIG. 1 is a flow chart showing the processing steps of the waste peel treatment system.

With reference to the drawings, the invention will now be described in detail with regard for the best mode and the preferred embodiment. In general, the invention is a method and a system comprising interrelated equipment for the treatment or processing of citrus peel or the like after juice and pulp have been extracted. While the invention will be herein described with particular reference to citrus peel and citrus oil, it is to be understood that the method and system is applicable to other fruits or vegetables of similar composition, as well as to other similar organic matter. In addition, while the method and system herein described is most preferably constructed and performed with controlled and continuous material processing and transport within and between the various processing steps and equipment, rather than by batch material processing and transport where bulk transfer is utilized, it is understood that not every continuous processing or handling step or equipment is essential to the core of the invention and that batch handling or processing could be substituted in certain instances. The general nature of the invention is shown in the flow chart of FIG. 1, where the process is seen to comprise conveying means 100 to convey waste peel into pulping means 120, heating means 110 to elevate the temperature of the waste peel prior to its introduction to the pulping means 120, pulping means 120 to fragment the waste peel to create relatively small particles in a slurry of water and citrus oil, solid/liquid separation means 130 to separate the liquid from the solid particles, drying means 140 to dry the solid particles for subsequent processing and oil/water separation means 150 to separate the citrus oil from the water. Preferably, the invention also further comprises heat recovery means 160 to recover heat from the exhaust gas of the dryer means 140 to preheat source air for the dryer means 140 and/or to evaporate water from a pressed filtrate containing residual citrus oil to create a molasses. In simpler language, the temperature of the waste peel is elevated to approximately 200 to 300 degrees F. and fragmented into particles preferably smaller than about one eighth cubic inches. This fragmentation ruptures a large number of the cell walls within the peel and thus releases a significant portion of the water and citrus oil to create a slurry or emulsion of peel particles, water and oil. The slurry is transferred onto a screen or sieve device where the water and oil is separated from the peel particles by a combination of mechanical vibration, gravitational forces and a hot water wash. The liquid is transferred to water and oil separating centrifuges where the citrus oil is separated from most of the water and solid particulate matter. The wet peel particles from the shaker table apparatus are pressed to remove residual water and oil prior to drying, with this press filtrate treated by a waste heat evaporator to concentrate the liquid into various degrees of brix molasses. The peel particles are dried further to remove residual water and oil, and the particles can then be pelletized, milled or alternatively processed as desired. Hot exhaust air from the dryer is cleaned and recycled, a portion being used to preheat source air for the dryer, and another portion being used to provide the heat energy source for a waste heat evaporator to create the molasses.

Figure 2:
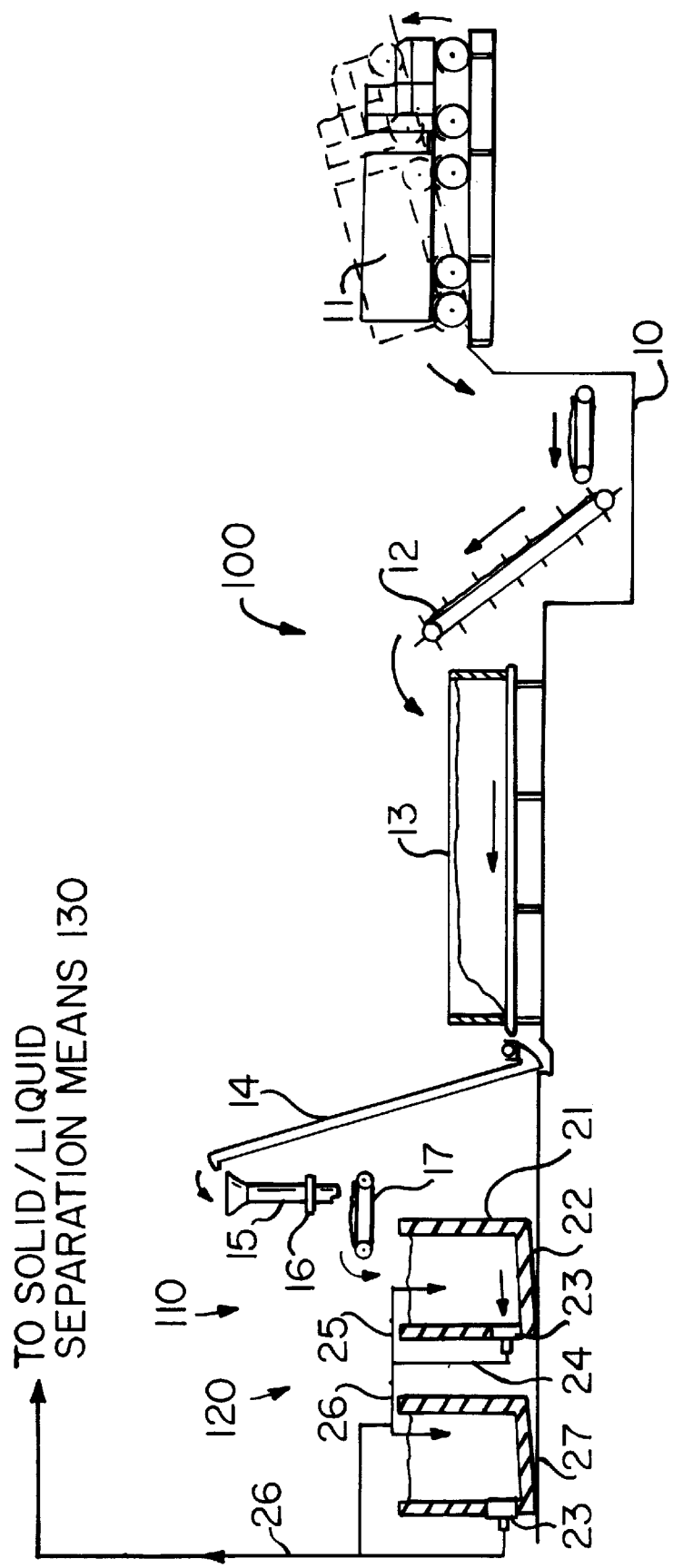
FIG. 2 is a schematic showing the components of the waste peel treatment system related to delivery, temperature elevation and fragmentation.
Figure 3:
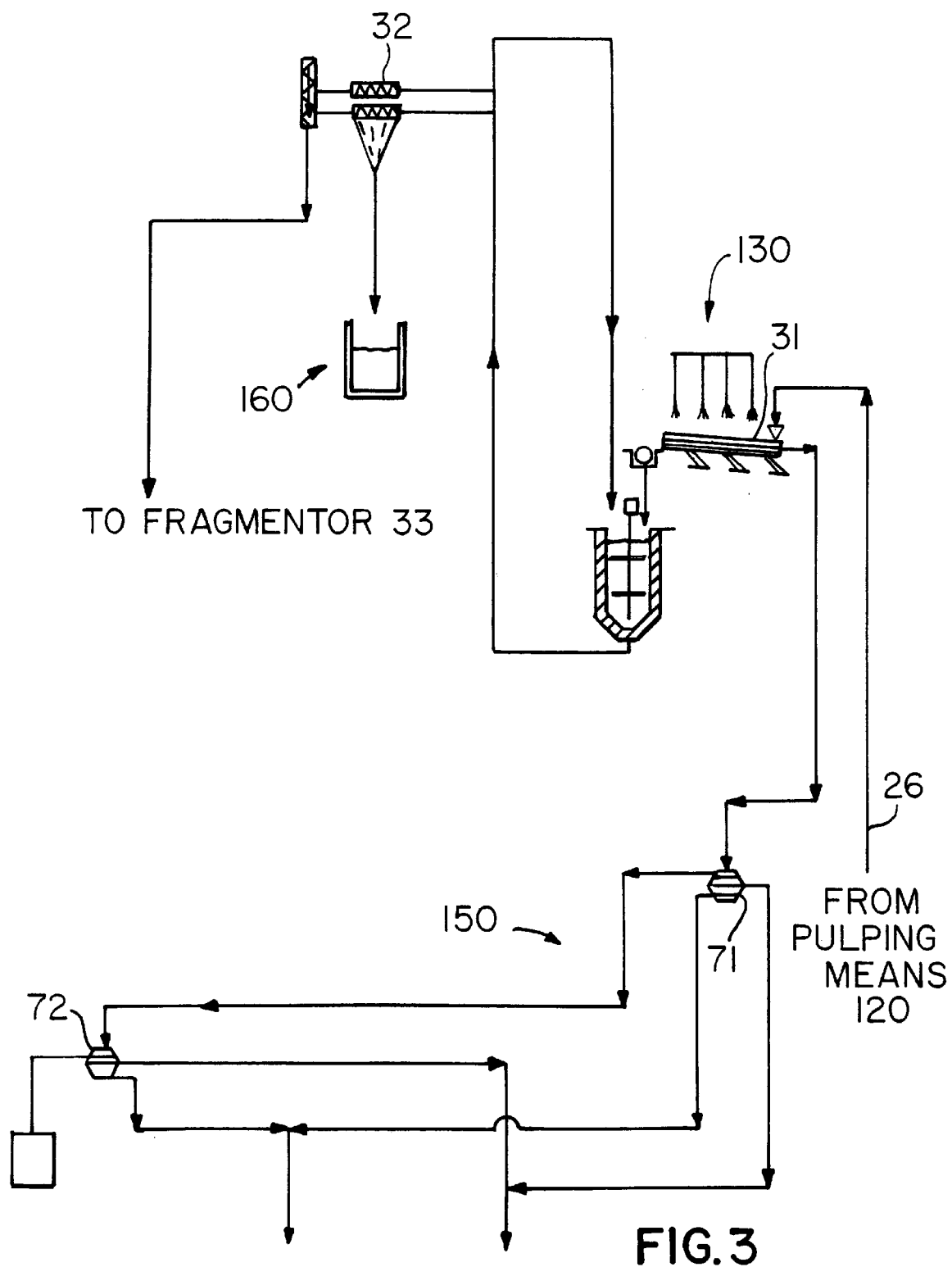
FIG. 3 is a schematic showing the components of the waste peel treatment system related to solid/liquid separation and oil/water separation.
Figure 4:
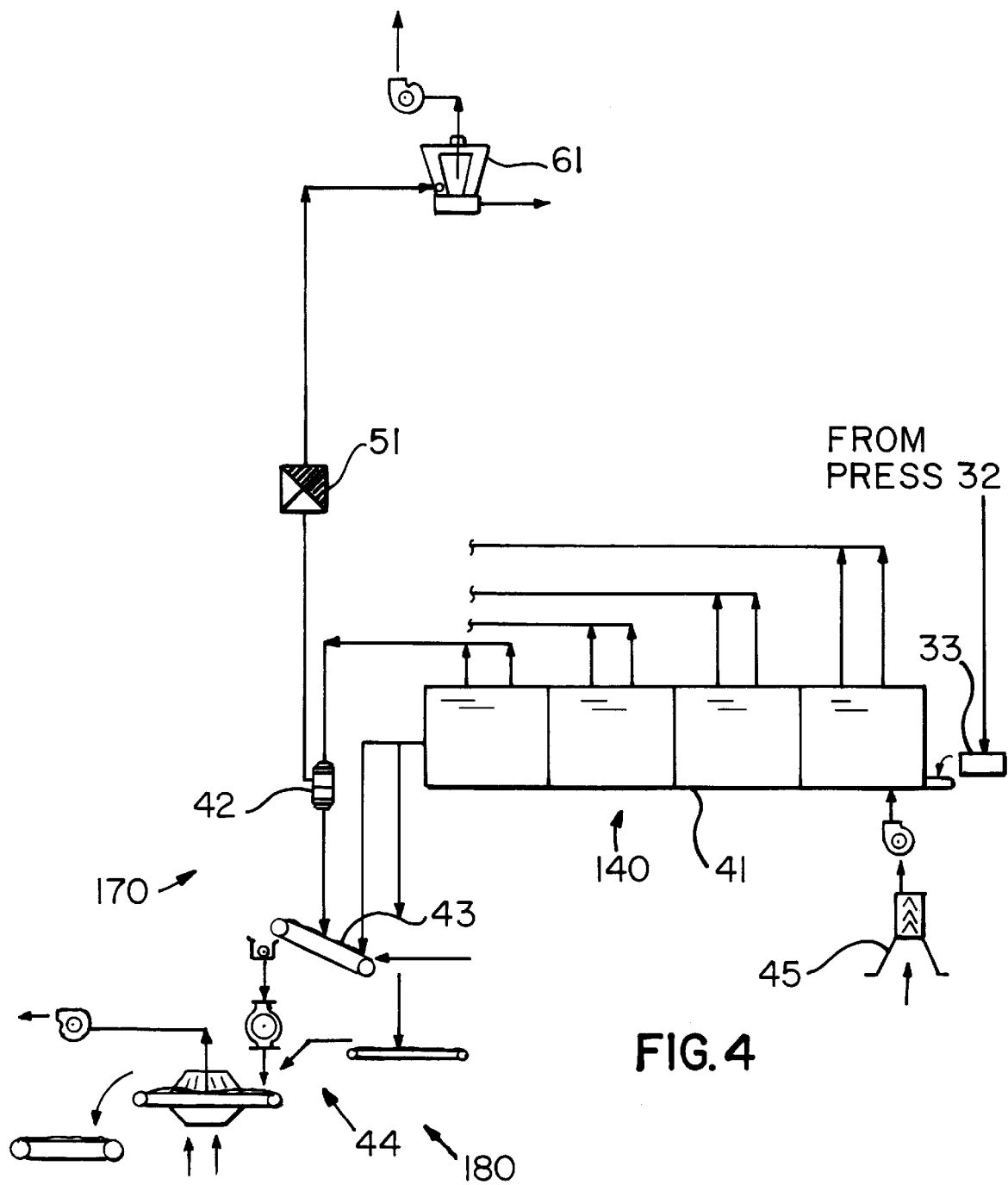
FIG. 4 is a schematic showing the components of the waste peel treatment system related to particle drying and processing, heat recovery and air exhaust.

The equipment comprising the system is illustrated in FIG. 2. The overall system comprises a number of processing stations where different operations are performed on the waste peel. As shown in the drawing, the waste peel conveyance means 100 comprises means to convey the waste peel either directly from a juice extraction operation, or as shown from a peel collection pit or live bottom discharge hopper 10 which receives peel dumped from transport trailers or trucks 11. An incline feeder conveyor 12 transports the peel into a live bottom storage conveyor bin 13, which is a self-feeding, designed for clean-in-place, conveying apparatus capable of storing the peel until activated by demand, whereupon the peel is deposited onto an transfer conveyor 14, preferably a tip-track bucket elevator type which is also designed for clean-in-place sanitary capability. Self cleaning and clean-in-place equipment is much preferred because the down-time required for cleaning is significantly less than for fixed bin-type storage set-ups with slide gates, screw conveyors, etc. The peel is delivered into a metering tube 15 which controls the flow of material onto the weigh belt 17 which continuously discharges into the pulping means 120. The metering tube 15 has sensors which maintain a fill level between minimum and maximum extremes, the sensors controlling the transfer conveyor and storage conveyor, such that a continuous and steady flow of material from the metering tube 15 is maintained, where a suitable size for the metering tube 15 is 8 feet in height, 4 feet in width and 1 foot in depth. The means 110 to elevate the temperature of the peel is preferably a steam jacket 16 mounted onto the metering tube 15, the steam jacket 16 injecting live steam into the material at a temperature of approximately 280 to 360 degrees F. from the perimeter of the metering tube 15 which elevates the temperature of the waste peel to about 130 to 200 degrees F. Elevating the temperature of the waste peel prior to fragmentation lowers the viscosity of the citrus oil so that a greater percentage of the oil contained in the peel will be released during the fragmentation step. Exposing the waste peel material to steam is the preferred method of elevating the temperature since this achieves the desired goal while minimizing the amount of water added to the material, since any water added in must be removed during later processing steps. The heated peel is deposited onto a continuous weigh belt 17 which continuously delivers the peel into the pulping means 120.

Pulping means 120 preferably comprises a large tank 21 with a sloped bottom 22 directing material flow by gravity into a high shear, disintegrator pump 23, which fragments the peel into particles preferably sized smaller than one eighth cubic inch. This high amount of fragmentation creates a slurry or emulsion of peel solid particles mixed with oil and water released from the peel. It is not necessary to add water from an outside source to form the slurry. The tank 21 may be approximately 10 feet in height by 8 feet in diameter with the disintegrator pump 23 approximately 3 feet in diameter and operating at about 350 hp to achieve a flow rate of about 3000 gallons per minute though a 6 inch diameter discharge conduit 24. The discharge conduit 24 is split into two conduits 25 and 26, the first a 6 inch diameter conduit returning the slurry back to the tank 21 and the second a 3 inch diameter conduit tapped into the 6 inch discharge conduit 24 delivering the slurry either into a holding tank 27 or directly to the liquid/solid separation means 130. By diverting a portion of the slurry from the discharge conduit 24 back into the tank 21, a particle will theoretically on average pass through the disintegrator pump 23 ten times before passing into the slurry holding tank 27 or the liquid/solid separation means 130. This multiple disintegration of the peel particles insures that a majority of the cell walls are disrupted in such fashion so that a large majority of the citrus oil residing in the peel is released into the slurry for later recovery. The amount of discharge from the disintegrator tank 21 is controlled so as to equal the mass flow into the tank 21, thus maintaining a constant level of product in the tank 21.

The slurry of disintegrated peel particles, water and citrus oil is transmitted to solid/liquid separation means 130, which preferably comprise a double-deck, inclined, vibratory shaker table 31 and a press 32, and most preferably comprises a plural number of shaker tables 31 arranged in parallel. The first separation processing of the slurry is performed by the shaker tables 31, which comprise an upper screen or sieve having apertures approximately one eighth inch in diameter, a lower screen or sieve having smaller apertures, preferably approximately 40 mesh or 10 thousandths of an inch, with a solid surface catch pan or sump beneath. Hot water at approximately 200 degrees F. is sprayed onto the slurry which is evenly spread onto the upper screen. The screens are vibrated in an eccentric fashion, such that the peel particles are directed across the upper screen from the low end to the raised discharge end, the screen having an incline of about 5 degrees. In this manner the solid particles reside on the screens sufficient time for gravitational and mechanically induced liquid/solid separation and drainage of the liquid through the screens and into the pan to occur, the upper screen trapping most of the larger particles and the lower screen trapping the remaining smaller particles, since only particles sized less than 40 mesh can pass through the lower screen, such that the liquid in the pan contains less than approximately 3% solids, the liquid remainder being mostly water and citrus oil. The liquid is transported to the oil/water separation means 150 and the wet particles are ejected off the screens at the upper end of the shaker tables 31 and conveyed to presses 32, preferably screw presses where an additional 10–15% of the residual water and oil is removed from the particles. This filtrate from the press 32, called press liquor, is preferably transported to the heat recovery evaporator means 160 for creation of molasses. After this second liquid/solid separation step, the particles, now in a form known as a pressed cake, are conveyed to a fragmentor 33 and then to the dryer means 140, the particles retaining approximately 65%.

The particle dryer means 140 comprises any suitable type dryer apparatus capable of evaporating water and other volatile materials from the wet peel particles such that a discharged product moisture content of less than about 15% is achieved. Preferably, dryer means 140 comprises a fluidized bed, stationary pan design, low temperature gas or indirect steam fired dryer unit 41 where the particles are moved by air pressure through the dryer unit 41, with the drying temperature being in the area of 450 degrees F. or less and with the residence time of the particles in the dryer apparatus 41 being approximately 5 minutes. The dried particles can then be cooled for storage or delivered by conveyor means 43 to processing means 180, which may comprise for example pelletizing equipment 44 as shown in the figure or milling equipment to produce flour, both of which are well known in the industry.

Preferably multiple air returns are provided to recycle the air through the dryer 41 in order to maximize the relative humidity percentage of the air prior to exiting the dryer circulation system. Because the drying temperature is kept relatively low and because most of the citrus oil has been removed from the particles prior to drying, the exhaust air is cleaner than that produced in high temperature drying units since there are less VOC's produced and there is less opportunity for charring or singeing of organics in the peel particles to occur. The hot exhaust air, which is high on the absolute humidity scale and contains very small particles, is passed through the particle screening means 170, which preferably comprises a stainless steel rotary screener or separator 42 which removes any particles greater than about 80 microns. This cleaned air may now be exhausted to atmosphere, but is most preferably routed through heat recovery means 160, which preferably encompasses a heat exchange apparatus 51 which can be used to preheat source air for the dryer supply air fans 45 as well as a heat source for waste heat evaporators to evaporate water from the filtrate recovered from the press 32 to create a molasses. In addition, the heat exchange process causes water to condense from the particulate-laden and saturated exhaust air, and this condensate can be cycled back to the hot water spray system for use on the shaker tables 31 or as wash water to clean the fruit prior to processing. The now cooler exhaust air may be scrubbed if necessary by air scrubbing equipment 61 and released to atmosphere.

The liquid produced by the shaker tables 31, an oil/water emulsion containing less than about 3% solids, is transported to water/oil separation means 150, which preferably comprise 3-stage centrifuges 71 of known structure which separate the liquid into three phases—solids, water and a light phase which is comprised of approximately 80% oil and 20% water. The solids are treated as waste, the water phase is mostly reused, while the light phase is delivered to a polishing centrifuge 72 which removes most of the water to produce a mixture of approximately 98% oil and 2% water. This mixture is placed into drums and winterized at about 20 degrees F. for about a month such that paraffins, waxes and other impurities congeal on the surface and are manually skimmed away to produce the marketable cold press peel oil, a product which currently sells for about 35 cents per pound. With the process as described, approximately 9 liters of processed peel oil can be extracted from a ton of waste peel, a three-fold increase over conventional processes. The unit process as described is capable of processing approximately 100,000 pounds of incoming waste peel per hour.

It is contemplated that equivalents and substitutions for certain components set forth above may be obvious to those skilled in the art, and the true scope and definition of the invention therefor is to be as set forth in the following claims.

I claim:

1. A system for processing waste peel to convert the waste peel into usable products and to remove residual liquid and oil from the waste peel comprising;

conveying means to convey waste peel into and through the system, heating means to elevate the temperature of the waste peel, prior to fragmentation pulping means to fragment the elevated temperature waste peel to create a slurry of solid particles and liquid, solid/liquid separation means to separate the solid particles from the liquid of the slurry, drying means to dry the solid particles, and oil/water separation means to separate the oil from the water of the liquid.

2. The system of claim 1, further comprising heat recovery means to recover exhaust heat from the drying means for reuse within the system.

3. The system of claim 2, further comprising particle screening means to clean exhaust air produced by said drying means.

4. The system of claim 1, further comprising processing means for processing the solid particles after drying.

5. The system of claim 1, where said conveying means comprises conveyor belts for conveyance of solids and conduits for conveyance of liquids or slurries such that material may be continuously moved through the system.

6. The system of claim 1, where said heating means comprises a steam jacket which directs steam onto the waste peel.

7. The system of claim 1, where said pulping means comprises a disintegrator pump which fragments the waste peel into particles sized less than one eighth cubic inch.

8. The system of claim 1, where said solid/liquid separation means comprises a vibratory shaker table.

9. The system of claim 1, where said drying means comprises a fluidized bed, stationary pan dryer.

10. The system of claim 1, where said oil/water separation means comprises a centrifuge.

11. The system of claim 1, where said conveying means comprises conveyor belts for conveyance of solids and conduits for conveyance of liquids or slurries such that material may be continuously moved through the system, where said heating means comprises a steam jacket which directs steam onto the waste peel, where said pulping means comprises a disintegrator pump which fragments the waste peel into particles sized less than one eighth cubic inch, where said solid/liquid separation means comprises a vibratory shaker, where said drying means comprises a fluidized bed, stationary pan dryer, and where said oil/water separation means comprises a centrifuge.

12. A system for processing waste peel to convert the waste peel into usable products and to remove residual liquid and oil from the waste peel comprising;

conveying means to convey waste peel into and through the system, heating means to elevate the temperature of the waste peel prior to fragmentation by exposing the waste peel to steam, pulping means to fragment the elevated temperature waste peel to create a slurry of solid particles and liquid, solid/liquid separation means to separate the solid particles from the liquid of the slurry, drying means to dry the solid particles, and oil/water separation means to separate the oil from the water of the liquid.

13. The system of claim 12, further comprising heat recovery means to recover exhaust heat from the drying means for reuse within the system.

14. The system of claim 13, further comprising particle screening means to clean exhaust air produced by said drying means.

15. The system of claim 12, further comprising processing means for processing the solid particles after drying.

16. The system of claim 12, where said conveying means comprises conveyor belts for conveyance of solids and conduits for conveyance of liquids or slurries such that material may be continuously moved through the system.

17. The system of claim 12, where said pulping means comprises a disintegrator pump which fragments the waste peel into particles sized less than one eighth cubic inch.

18. The system of claim 12, where said solid/liquid separation means comprises a vibratory shaker table.

19. The system of claim 12, where said drying means comprises a fluidized bed, stationary pan dryer.

20. The system of claim 12, where said conveying means comprises conveyor belts for conveyance of solids and conduits for conveyance of liquids or slurries such that material may be continuously moved through the system, where said pulping means comprises a disintegrator pump which fragments the waste peel into particles sized less than one eighth cubic inch, where said solid/liquid separation means comprises a vibratory shaker, where said drying means comprises a fluidized bed, stationary pan dryer, and where said oil/water separation means comprises a centrifuge.

21. A method of processing waste peel to convert the waste peel into usable products and to remove residual liquid and oil from the waste peel comprising elevating the temperature of the waste peel prior to fragmentation, fragmenting the elevated temperature waste peel to create a slurry, separating the solid particles from the liquid in the slurry, drying the solid particles, and separating the oil from the water in the liquid.

22. The method of claim 21, where said step of elevating the temperature of the waste peel comprises exposing the waste peel to steam.

23. The method of claim 21, where said step of fragmenting the elevated temperature waste peel comprises repeatedly passing the waste peel through a disintegrator pump such that the maximum solid particle size is one eighth cubic inch.

24. The method of claim 21, where said step of separating solid particles from the liquid in the slurry is comprised of conveying the slurry onto a vibratory shaker table which removes approximately 90% of the solid particles from the slurry.

25. The method of claim 21, where said step of drying the solid particles comprises passing the solid particles through a fluidized bed dryer at a maximum temperature of approximately 450 degrees F.

26. The method of claim 21, where said step of separating oil from water in said liquid comprises passing said liquid through a centrifuge.

27. The method of claim 21, where said step of elevating the temperature of the waste peel comprises exposing the waste peel to steam, where said step of fragmenting the elevated temperature waste peel comprises repeatedly passing the waste peel through a disintegrator pump such that the maximum solid particle size is one eighth cubic inch, where said step of separating solid particles from the liquid in the slurry is comprised of conveying the slurry onto a vibratory shaker table which removes approximately 90% of the solid particles from the slurry, where said step of drying the solid particles comprises passing the solid particles through a fluidized bed dryer at a maximum temperature of approximately 450 degrees F., and where said step of separating oil from water in said liquid comprises passing said liquid through a centrifuge.

* * * * *